Jan. 7, 1964   L. R. WOSIKA   3,116,908
SPLIT WHEEL GAS TURBINE ASSEMBLY
Filed April 4, 1961   3 Sheets-Sheet 1

INVENTOR
Leon R. Wosika
BY
ATTORNEYS

Jan. 7, 1964 L. R. WOSIKA 3,116,908
SPLIT WHEEL GAS TURBINE ASSEMBLY
Filed April 4, 1961 3 Sheets-Sheet 2

INVENTOR
Leon R. Wosika

BY
ATTORNEYS

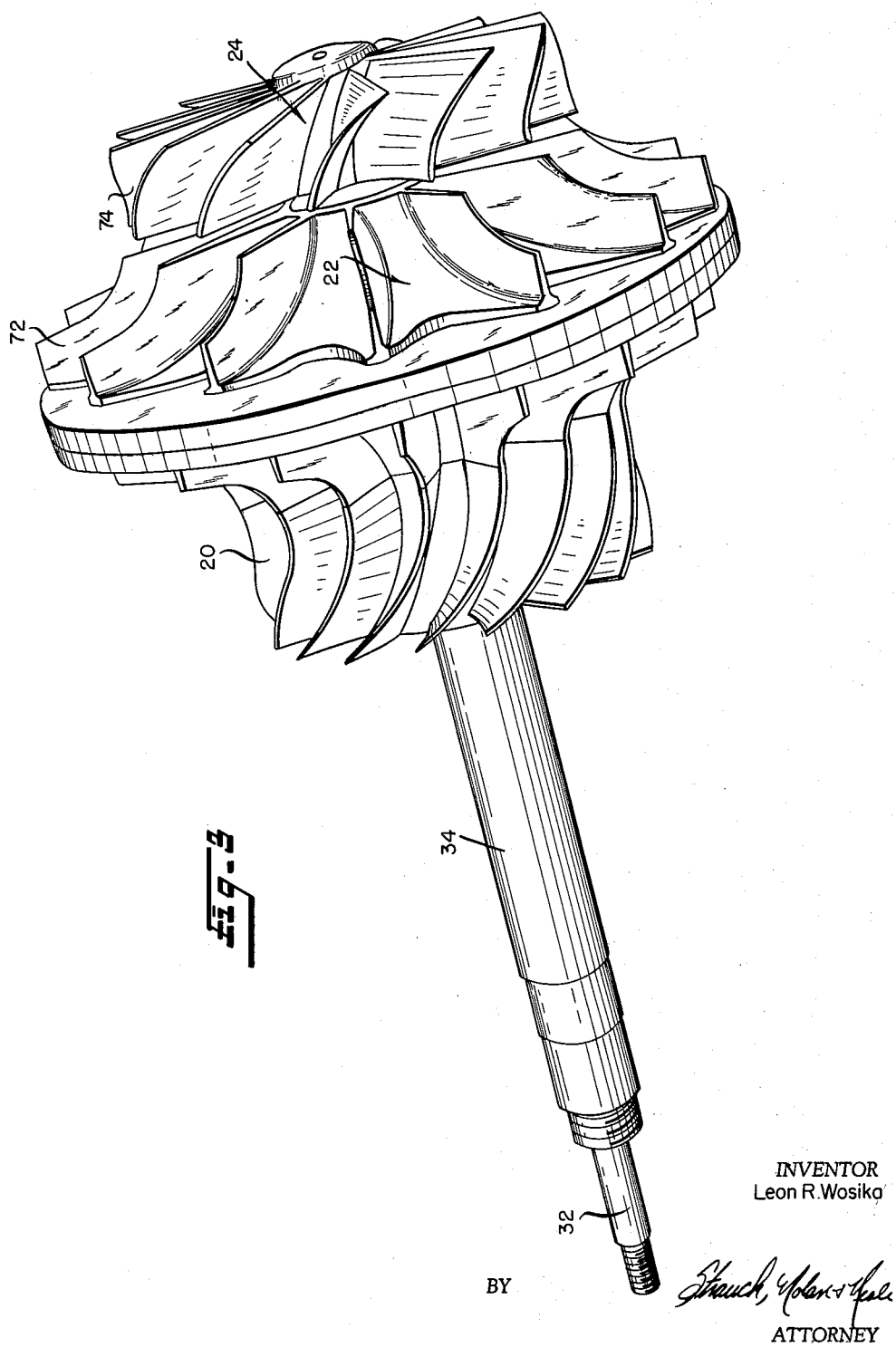

3,116,908
SPLIT WHEEL GAS TURBINE ASSEMBLY
Leon R. Wosika, San Diego, Calif., assignor to Solar Aircraft Company, San Diego, Calif., a corporation of California
Filed Apr. 4, 1961, Ser. No. 100,644
2 Claims. (Cl. 253—40)

This invention relates to gas turbines, and more specifically to a lightweight compact multistage turbine engine characterized by a novel matching of high pressure gas producer turbine rotor and low pressure power output turbine rotor which eliminates the requirement for stator vanes between the turbine stages while permitting rotation of the rotors in the same direction.

There exists an increasing potential for small gas turbines to serve as prime movers for light air-borne vehicles such as helicopters, for portable power plants, and for auxiliary power sources in large aircraft such as transports, bombers, and the like. Prime requisitions for such small power plants are that they be compacted into the smallest possible space and entail the least possible weight penalty. However, despite the need for reduction of size and weight, standard practice throughout the industry has dictated that whenever a plurality of rotor stages is employed rotating in the same direction, each stage must be supplied with its specific nozzle, i.e., stator vanes which, for a first stage rotor, accept the gas flow from the combustion chamber and direct it at the optimum angle to the rotor blades, and, for subsequent stages, accept the flow from the preceding rotor and redirect it for best efficiency to the blades of the next rotor.

I have discovered that, by proper selection of blade configuration and blade number, a two-stage turbine may be caused to operate with its rotors rotating in the same direction efficiently without the necessity of intervening vanes. That is, I follow standard practice by providing a nozzle ring for the first rotor, but, in effect, utilize the first rotor as the nozzle ring for the second rotor.

Therefore, a primary object of my invention is to provide a dual shaft or split wheel centripetal flow gas turbine characterized by an arrangement in which the two turbine rotors are in close juxtaposition with no intervening stator vanes, and in which the rotors rotate in the same direction.

Another object is to provide an assembly of a high pressure radial flow gas producer turbine rotor and a low pressure axial flow power turbine rotor of novel matching characteristics which eliminates the necessity of an intervening stator assembly.

A corellary object is to provide a dual shaft gas turbine of more compact size and lighter weight than known gas turbines of comparable power output.

The above and other objects and advantages of the invention will become apparent from a study of the following specification taken in conjunction with the appended claims and the annexed drawings, in which:

FIGURE 3 is a perspective view of rotor assembly incorporating my invention.

Figure 1:
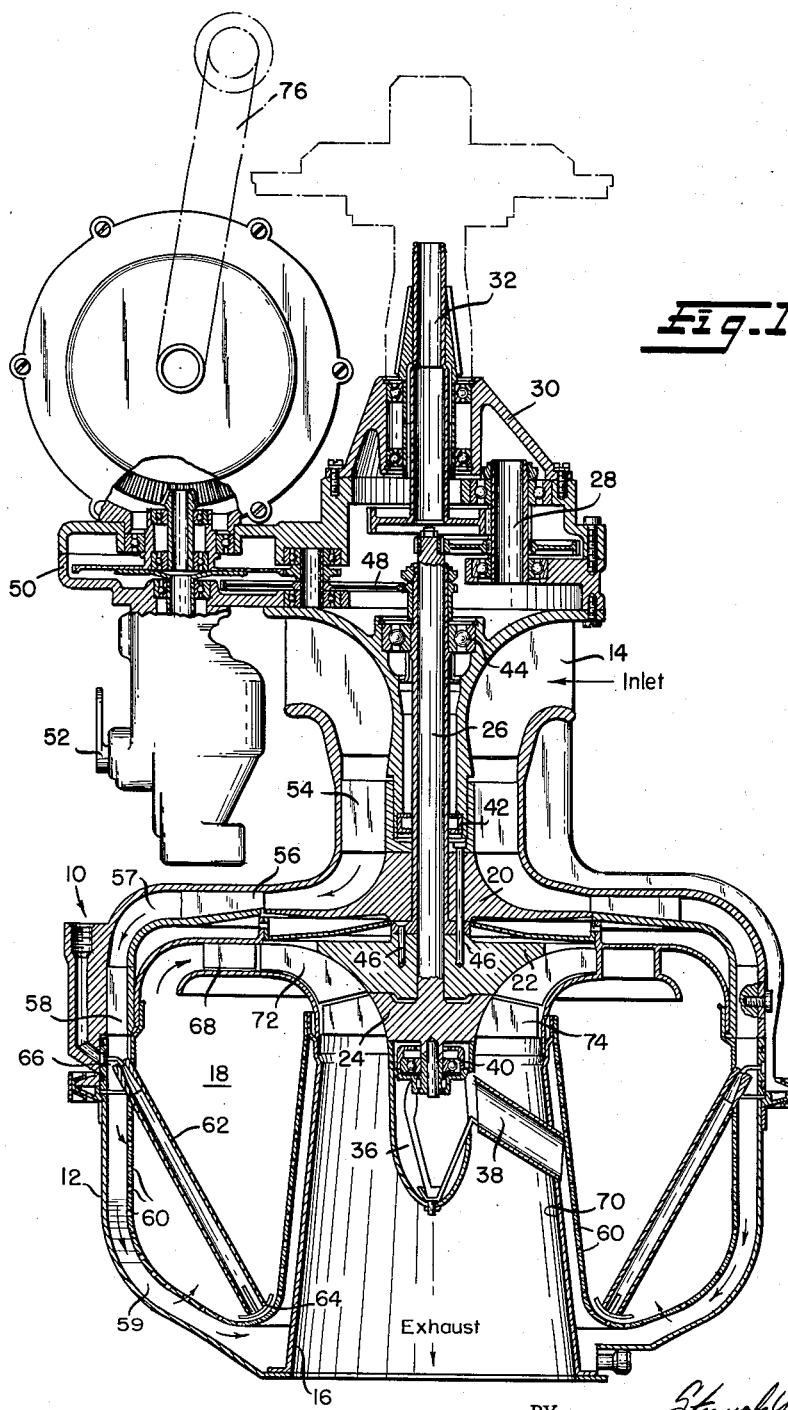
FIGURE 1 is a sectional view of a dual shaft combustion gas turbine incorporating the invention.
Figure 2:
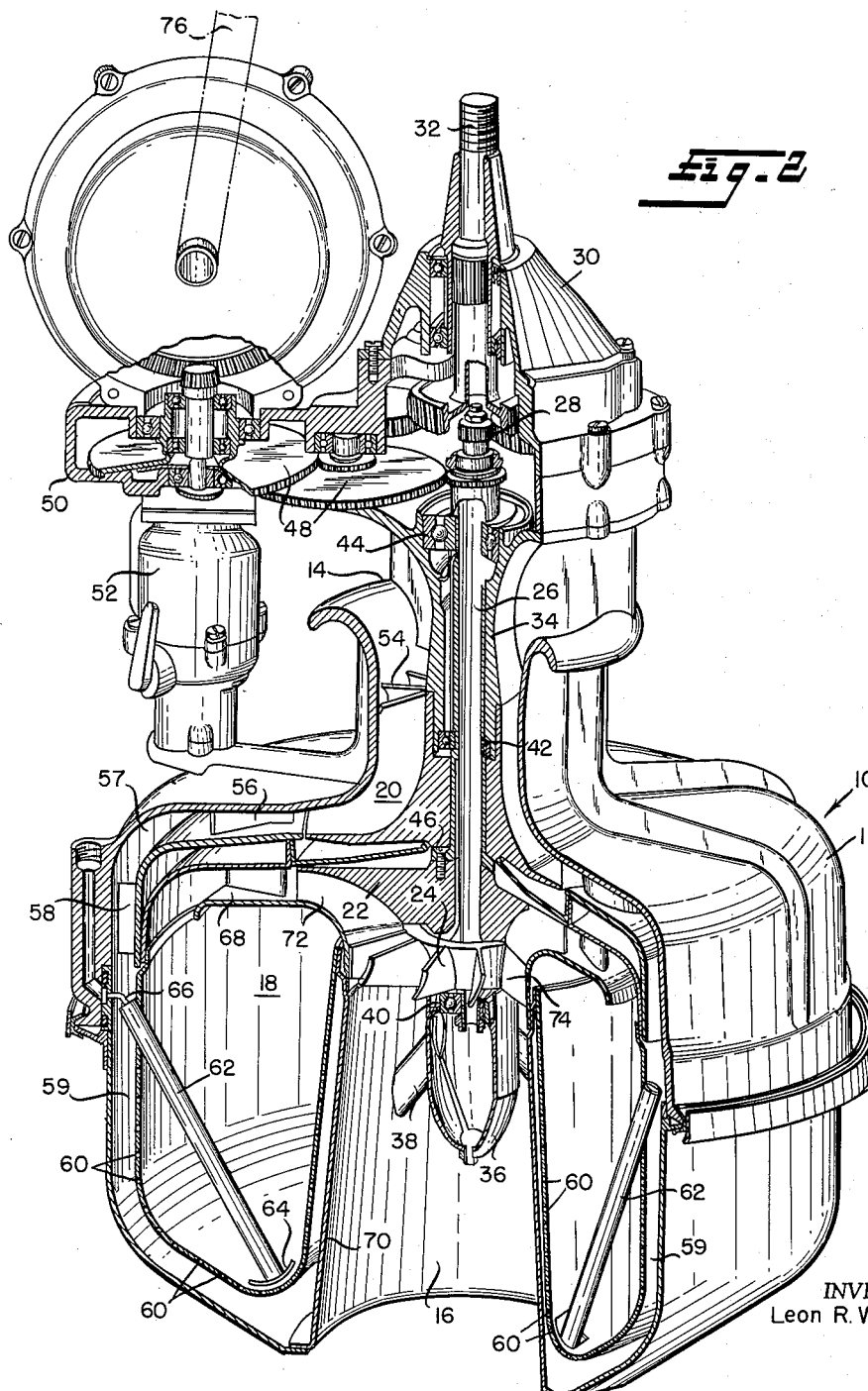
FIGURE 2 is a perspective view in one-quarter section which more clearly shows the relation of the two turbine rotor stages.

In general, the invention involves a multistage turbine assembly comprising independently rotatable high pressure and low pressure rotors, one rotor being used for power output, while the other rotor is used to supply auxiliary power within the power plant, as for example, to drive the compressor and fuel pump in the case of a combustion gas turbine type of prime mover. In the case of a combustion gas turbine type of prime mover, the first stage or high pressure rotor is of the radial centripetal flow type and receives combustion products from a stationary nozzle ring the blades of which are directed at optimum angle to impart rotation to the rotor, the gases flowing through the rotor blades to effect rotation, either by impulse, or by a combination of impulse and reaction. The gases discharge axially from the high pressure rotor with considerable velocity and pressure, and are fed directly axially into a juxtaposed low pressure axial flow turbine rotor having blades of a configuration to utilize the gases to effect rotation of the low pressure rotor in the same direction as the high pressure rotor, there being no intervening stator vanes between the rotors to change the direction of the gases and/or to affect their velocity. In the preferred embodiment, the high pressure rotor is of the centripetal flow type, receiving the products of combustion generated within a combustion chamber by way of a ring of nozzles in a generally radial inward direction, the rotor discharging in a generally axial direction. The rotor has blading of a configuration to efficiently utilize the energy in the combustion products to effect rotation thereof and to discharge the gases in an axial direction with a rotational component to be received directly in the blades of the juxtaposed low pressure axial flow turbine rotor, in which the blades have a properly designed configuration to efficiently utilize the energy in the exhaust gases from the high pressure rotor to effect rotation of the low pressure rotor in the same direction as the high pressure rotor. The exhaust gases from the low pressure rotor are discharged in an axial direction to atmosphere through a diffuser.

Regarding the operation of the present power plant, it is well known in single wheel centrifugal flow gas turbines to provide the turbine wheel with vanes which at the forward portion are of radial type, with the aft portion twisted or curled such that the combustion gases, having imparted energy to the forward portion of the vanes, is caused to "work" against the exducer portion of the vane which extracts further energy from the gases.

The problem, then was to determine if and how a separation could be achieved between the radial blade area and the exducer portion so the latter could independently drive a power shaft as a free wheel.

The first obvious approach involved merely splitting the turbine wheel in a plane at which the radial vane portion and exducer portion met, thus providing two wheels with an equal number of vanes on each. However, it was determined first by analysis and then by actual test that if the gas producer turbine has the same number of vanes as the power turbine, output torque variation will occur. That is, at any instant each of the gas producer vanes bears the same relative position to its adjacent power turbine vane as does each other gas producer vane to its corresponding power vane. Thus, if the opposed vanes are slightly out of phase, torque losses occur with maximum loss apparently encountered when the vanes are approximately equidistantly separated.

From the results above, it became apparent that at least a one-vane difference would be required. Therefore, a gas producer wheel of 13 vanes was opposed to a 12-vane power turbine. However, tests showed that a completely unacceptable increase in vibration amplitude occurred when the two rotors were operating at or close to the same speed. That is, a rotating radial gas load was applied to the power rotor as the result of the unsymmetrical alignment of gas producer and power vanes, and severe rubbing of the power rotor followed.

It then was found that by making the vane difference two, i.e., a gas producer with 14 vanes and a power turbine of 12 vanes, misalignment at any instant is between vanes 90 degrees apart and, therefore, the gas loads on the vanes have no net radial component. Making the difference any number greater than two has the same useful effect, but efficiency is sacrificed.

Therefore, the invention can be summarized as applying the discovery that a radial gas producer turbine may be combined with an exducer type power turbine both rotating in the same direction without the requirement of a stator stage provided there exists a difference of at least two vanes between the two rotors. The difference may be achieved either by adding vanes to the gas producer turbine or subtracting vanes from the power turbine.

Referring in detail to the accompanying drawings, there is illustrated an application of the invention in connection with a combustion gas turbine 10 having a housing 12 including an air inlet 14 at one end and an exhaust outlet 16 at the other end, the housing being provided with an annular combustion chamber 18 intermediate its ends.

A centrifugal air compressor 20 is rotatably mounted within the housing 12 adjacent the air inlet 14. The combustion gas turbine 10 also includes a high pressure or gas producer turbine rotor 22 and a low pressure turbine rotor 24, the latter being mounted for rotation on a power output shaft 26 for delivering useful power through reduction gearing 28 within a gear box 30, to a power take-off shaft 32. The high pressure turbine rotor 22 is rotatably mounted on a hollow shaft 34 surrounding the power output shaft 26.

A thrust bearing housing 36, supported from the housing 12 by a series of spaced radial struts 38, includes a thrust bearing 40 rotatably carrying one end of the power output shaft 32, the other end having bearing within the hollow shaft 34. The hollow shaft 34 is supported by a pair of spaced bearings 42 and 44, and is connected, at the upper end, through a reduction gearing 48 within an accessory gear box 50, to various accessories including a fuel control assembly 52. A driving connection 46 is interposed between the high pressure turbine rotor 22 and the air compressor 20.

From the foregoing, it is seen that, in operation of the gas turbine power plane, the high pressure or gas producer turbine rotor 22 delivers the power to operate the air compressor 20 and the other accessories of the power plant, and the low pressure or power output turbine rotor 24 delivers the useful power to the power take-off shaft 32. It is evident, however, that useful power could be taken from the high pressure turbine rotor 22 and that the accessories, including the compressor 20, could be driven by the low pressure turbine rotor 24.

Air entering the housing 12 through the air inlet 14 in a radially inward direction is deflected in an axial flow and passes through a ring of inlet directing vanes 54 on the intake side of the centrifugal air compressor 20, which gives to the air entering the compressor vanes the desired spin for optimum efficiency. The air is discharged from the vanes of the air compressor at high velocity into a ring of generally radially directed diffuser vanes 56 which take out some of the spin in the air and increase the pressure thereof, thence through annular turn 57 and axial vanes 58. The air is then conducted through a jacket 59 surrounding the annular combustion chamber 18 and a major portion thereof is discharged into the combustion chamber through a plurality of apertures 60, thereby effectively cooling the walls of the combustion chamber and mixing with and diluting the products of combustion within the combustion chamber to lower the temperature thereof, as is usual in the art. A plurality of spaced fuel supply tubes 62 extend across the combustion chamber 18, the lower ends of which mount baffles 64 disposed in spaced relation with the adjacent wall of the combustion chamber. The baffles 64 have a contour generally conforming with the contour of the adjacent combustion chamber wall to provide a space to receive the discharge of a fuel/air mixture from the lower ends of the fuel supply tubes 62 and to feed the fuel/air mixture into the lowermost end of the combustion chamber 18 wherein it is ignited and burned to produce the motive fluid, as will be seem more clearly hereinafter. The upper ends of the fuel supply tubes 62 are disposed within the air jacket 59 in a direction to entrain some of the air discharged from the axial turning vanes 58. Each inlet includes a fuel injector 66 to supply a desired fuel-air ratio to the air entrained within the supply tubes 62, the fuel and air being thoroughly mixed within the supply tubes 62 and heated therein to vaporize the fuel.

The fuel-air mixture is discharged from the lower ends of the supply tubes 62 above the baffles 64 and thence into the combustion chamber 18 to be burned therein to produce products of combustion, which products are mixed and diluted with air discharging from the apertures 60 to form the motive fluid at a reduced temperature.

The upper end of the combustion chamber 18 includes a generally radially directed nozzle ring 68 which discharges the motive fluid in the desired direction onto and through blades 72 of the high pressure rotor 22 to effect rotation thereof. The motive fluid discharging from the blades 72 is directed onto blades 74 of the low pressure rotor 24 to effect rotation of the latter, and the exhaust motive fluid discharging at a subatmospheric pressure escapes to the atmosphere by a diffuser 70.

A starting crank handle 76 is connected with the hollow shaft 34 and the compressor driving turbine rotor 22 through the gearing 48 for manually bringing the centrifugal air compressor 20 up to self-sustaining speed.

It may be seen from the drawings that the high pressure rotor 22 is of the centripetal, or radially inflow type turbine receiving the motive fluid from the fixed radially inwardly opening nozzle ring 68 with a properly designed tangential spin, and that the motive fluid is discharged from the rotor in a generally axial direction having a desired tangential component. The blading 72 may be of the impulse or of the impulse-reaction type, permitting the discharge of the motive fluid at the desired pressure and velocity. The blades 74 of the low pressure rotor 24 are of the impulse type or impulse-reaction type and are designed for generally axial flow of motive fluid. The blades 72 of the high pressure rotor 22 and the blades 74 of the low pressure rotor 24 are designed to effect rotation of the rotors in the same direction at the same speeds or at different speeds of rotation. It should also be observed that the inlet of the low pressure rotor 24 is adjacent the outlet of the high pressure rotor 22 and that no intervening stator vanes are provided to change the direction of flow of the motive fluid between the rotors.

It has been determined by analysis and proven by tests that, in the case of two rotors turning in the same direction, objectionable output torque variations occur when the same number of vanes are provided in both the high pressure and in the low pressure rotors. This objectionable condition probably stems from the fact that, at any instant, each of the blades of the high pressure rotor bears the same relative position to the blades of the adjacent low pressure rotor. Thus, if the blades of the two rotors are slightly out of phase, torque losses occur with maximum loss apparently encountered when the blades are approximately equidistantly separated.

From the above, it appeared that at least a one-blade difference would be the answer, as, for example, a high pressure rotor of 13 blades being opposed to a low pressure rotor of 12 blades. However, tests of a pair of rotors having one blade difference showed that a completely unacceptable increase in vibration amplitude occurred when the two rotors were operating at or close to the same speed. That is, a rotating radial gas load was applied to the low pressure rotor as the result of the unsymmetrical alignment of the blades of the two rotors, causing a severe rubbing of the low pressure rotor.

It was then discovered that, by making the blade difference two, that is, for example, a high pressure turbine rotor with 14 blades and a low pressure turbine rotor with 12 blades, misalignment at any instant is exactly balanced at 180° and therefore the gas loads on the blades have no net radial component. It was also discovered that, by increasing the difference to three or more, the same useful vibration amplitude minimizing effect is obtained as with a difference of two, but efficiency falls off. Optimum efficiency is obtained with a difference of two blades, which also results in the lowest cost turbine.

While, in the discussion appearing above, the high pressure rotor has the greater number of blades, the same difference in the number of blades may be obtained by providing the high pressure rotor with fewer blades.

In the embodiment illustrated referring to FIGURE 3, the high pressure rotor 22 is provided with fourteen (14) blades 72 and the low pressure rotor is provided with twelve (12) blades 74. The particular number shown is only exemplary. Any number may be used, the important feature being that the difference should be at least two, and that optimum conditions exist when the difference is only two, the efficiency falling off when the difference is more than two, and a difference of less than two producing objectionable operating conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A split wheel gas turbine assembly comprising a radial flow turbine having a radial inlet and an axial outlet, means for directing motive fluid into said radial flow turbine inlet to produce rotation thereof in a predetermined direction, and an axial flow turbine disposed in axial alignment with and with its inlet in immediate juxtaposition to the outlet of said radial flow turbine so that motive fluid flows directly from said radial flow turbine into said axial flow turbine, the inclination of the blades of said power turbine being such that said power turbine rotates in the same direction as said radial flow turbine, the numbers of blades of said turbines differing by two and the blades of said power turbine being directed to impart rotation to said power turbine in said predetermined direction.

2. The assembly defined in claim 1 wherein the root and tip diameters of the inlet ends of the blades of said low pressure turbine are substantially equal to the root and tip diameters respectively of the outlet ends of the blades of said high pressure turbine.

References Cited in the file of this patent

UNITED STATES PATENTS

| | | |
|---|---|---|
| 2,575,682 | Price | Nov. 20, 1951 |
| 2,821,067 | Hill | Jan. 28, 1958 |
| 2,933,884 | Foster | Apr. 26, 1960 |
| 3,010,281 | Cervenka | Nov. 28, 1961 |
| 3,065,954 | Whitaker | Nov. 27, 1962 |

FOREIGN PATENTS

| | | |
|---|---|---|
| 677,835 | Great Britain | Aug. 20, 1952 |
| 706,070 | Great Britain | Mar. 24, 1954 |